(No Model.)
J. N. CHEW.
Cattle Pens.
No. 232,683.  Patented Sept. 28, 1880.
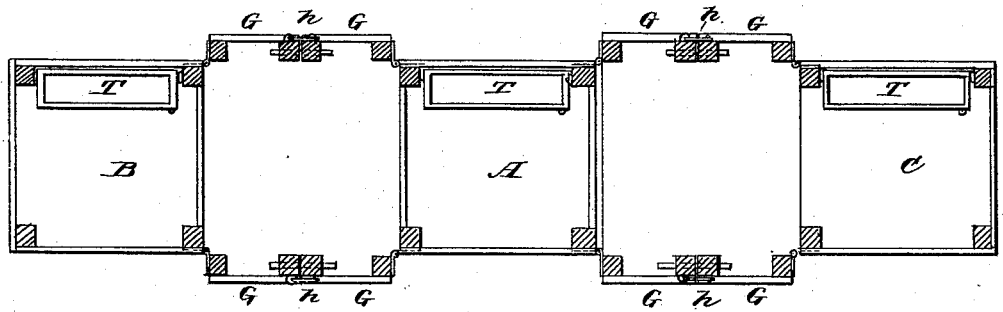
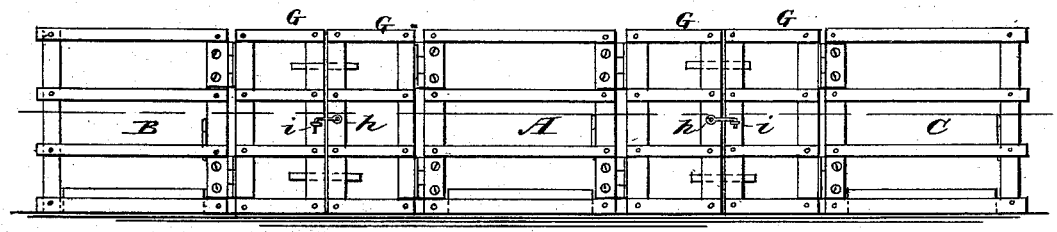
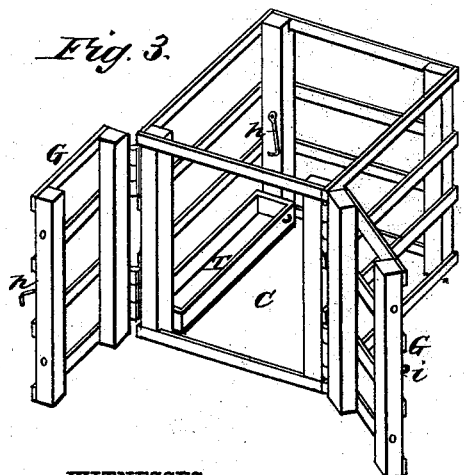
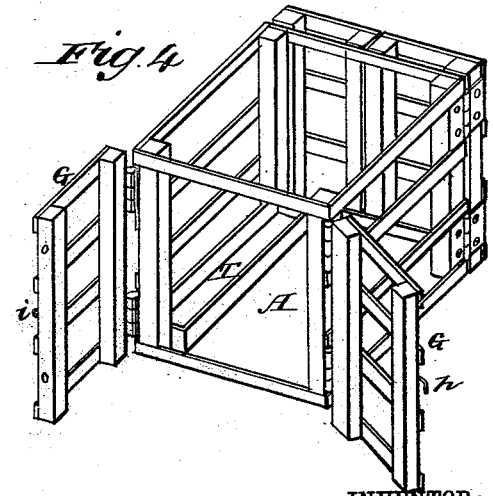
WITNESSES:
Francis McArdle
C. Sedgwick
INVENTOR:
J. N. Chew
BY Munn & Co
ATTORNEYS.

UNITED STATES PATENT OFFICE.

JOHN N. CHEW, OF LOGAN, IOWA.

CATTLE-PEN.

SPECIFICATION forming part of Letters Patent No. 232,683, dated September 28, 1880.

Application filed June 23, 1880. (No model.)

*To all whom it may concern:*

Be it known that I, JOHN N. CHEW, of Logan, in the county of Harrison and State of Iowa, have invented a new and useful Improvement in Cattle-Pens, of which the following is a specification.

My invention relates to a pen or inclosure which may be used for either swine and other small animals or for large cattle of all kinds.

The invention consists in forming a portable pen of sections that may be easily handled and transported, and are so constructed that one, at least, of the sides is made in the shape of swinging sub-sections or gates that form, with corresponding sub-sections or gates on the next adjacent section, a neat and stable connection, as hereinafter more fully described.

In the accompanying drawings, Figure 1 represents a top or horizontal sectional view of a pen embodying my improvement. Fig. 2 is a side view of the same. Figs. 3 and 4 are perspective views of two of the sections.

Similar letters of reference indicate corresponding parts.

There may be any suitable number of sections of the pen, and each section may be of any suitable shape and dimensions. As here represented, there are three sections, which are designated by the letters A B C.

Each section consists of a quadrangular fence composed of vertical posts and horizontal rails or stiles. If desired, (as it may be in some cases when used for small animals,) vertical palings may be employed instead of horizontal rails or bars.

Each section is provided with a trough, T, which is hinged or pivoted so that it may be turned up out of the way when not in use.

Each section is provided with gates G on one or more sides, divided in the middle and arranged to swing outward.

In the drawings, the section A is shown as provided with two pairs of gates on two opposite sides, and the sections B and C with gates on only one side.

It will be seen that the sections may each be used separately as a small pen, or they may be connected together to form a large inclosure. In the latter case the section A is arranged in the middle, with its gates G on opposite sides opened outward, and the sections B and C are placed at the ends, with their gates G opened outward, so as to meet the gates of the middle section.

The gates are connected to each other by means of the hooks $h$ and staples $i$, which are used for fastening them when closed.

By the construction above described I produce a portable pen which may be moved from place to place at pleasure.

Having thus described my invention, I claim as new and desire to secure by Letters Patent—

A portable pen for animals consisting of two or more sections, A B, connecting with each other at one side by outwardly-swinging gates G G, each gate being made to joint with a corresponding one on the next adjacent panel, as shown and described.

JOHN NELSON CHEW.

Witnesses:
J. A. PHLLIPS,
G. H. BUNTON.